(12) United States Patent
Meinzinger

(10) Patent No.: US 8,636,489 B2
(45) Date of Patent: Jan. 28, 2014

(54) APPARATUS FOR THE SHAPING OF PLASTICS-MATERIAL CONTAINERS WITH A BLOW MOULD

(75) Inventor: Rupert Meinzinger, Kirchroth (DE)

(73) Assignee: Krones AG, Neutraubling (DE)

( * ) Notice: Subject to any disclaimer, the term of this patent is extended or adjusted under 35 U.S.C. 154(b) by 208 days.

(21) Appl. No.: 12/871,506

(22) Filed: Aug. 30, 2010

(65) Prior Publication Data

US 2011/0052747 A1    Mar. 3, 2011

(30) Foreign Application Priority Data

Sep. 2, 2009    (DE) .......................... 10 2009 039 696

(51) Int. Cl.
*B29C 49/56*    (2006.01)

(52) U.S. Cl.
USPC ................................ 425/3; 425/195; 425/541

(58) Field of Classification Search
USPC ...................... 425/3, 193, 195, 541
See application file for complete search history.

(56) References Cited

U.S. PATENT DOCUMENTS

| | | | |
|---|---|---|---|
| 552,098 A | | 12/1895 | Chamberlain |
| 5,352,394 A | * | 10/1994 | Fujita et al. .................. 264/40.5 |
| 6,386,857 B1 | * | 5/2002 | Nava .............................. 425/526 |
| 6,619,940 B1 | * | 9/2003 | Wang et al. ........................ 425/3 |
| 2006/0233909 A1 | | 10/2006 | Perez et al. |
| 2007/0269545 A1 | * | 11/2007 | Ellis et al. .......................... 425/3 |

FOREIGN PATENT DOCUMENTS

| | | |
|---|---|---|
| DE | 36 13 543 C1 | 12/1986 |
| EP | 0 893 221 A2 | 1/1999 |
| JP | 09174559 A * | 7/1997 |

* cited by examiner

*Primary Examiner* — Robert B Davis

(74) *Attorney, Agent, or Firm* — Novak Druce Connolly Bove + Quigg$^{LLP}$

(57) ABSTRACT

An apparatus for the shaping of plastics-material containers with a blow mold, wherein the blow mold has at least one first and one second blow-mold part, may include at least one first and one second carrier element for holding the blow-mold parts. The carrier elements are movable relative to one another at least in one plane, in order to be transferred at least from a closed configuration into an opened configuration. In this case the carrier elements each have a receiving area for receiving one blow-mold part in each case, wherein the blow-mold parts in the closed configuration form at least one cavity for the expansion of the containers. The blow-mold parts may be capable of being coupled in a magnetic and releasable manner to each other and/or at least one of the blow-mold parts is capable of being coupled in a magnetic and releasable manner to at least one carrier element.

18 Claims, 6 Drawing Sheets

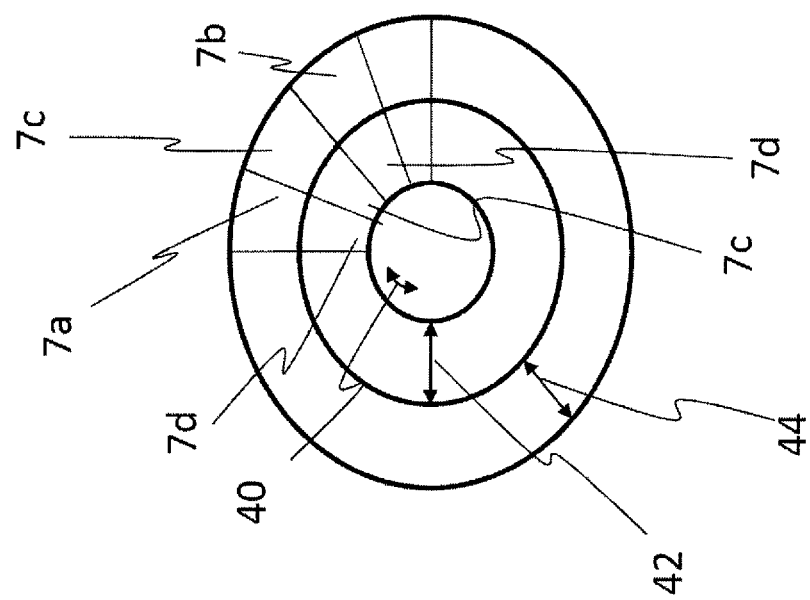

APPARATUS FOR THE SHAPING OF PLASTICS-MATERIAL CONTAINERS WITH A BLOW MOULD

CROSS-REFERENCE TO RELATED APPLICATION

This application claims the benefit of priority of German Patent Application No. 10 2009 039 696.9, filed Sep. 2, 2009, pursuant to 35 U.S.C. 119(a)-(d), the disclosure of which is incorporated herein by reference.

TECHNICAL FIELD

The present disclosure relates to an apparatus for the shaping of plastics-material containers with a blow mould and, more particularly, to an apparatus for the shaping of blanks to form containers in the beverage industry.

BACKGROUND

Conventional apparatuses for the shaping of plastics-material containers with a blow mould have the problems that changing the blow moulds and/or fixing the blow moulds is very time-consuming and requires complex mechanical devices.

It may therefore be desirable to provide an apparatus for the shaping of plastics-material containers with at least one blow mould, which permits a more simplified and rapid exchange and/or fixing of the blow mould in the apparatus as compared with conventional apparatuses.

SUMMARY OF INVENTION

According to various aspects of the disclosure, an apparatus for the shaping of plastics-material containers with a blow mould, in which the blow mould comprises at least one first and one second blow-mould part, may include at least one first and one second carrier element for holding the blow-mould parts. The carrier elements may be movable relative to one another at least in one plane. This is necessary in order that the carrier elements or blow-mould parts can be transferred from a closed configuration into an opened configuration or vice versa.

It may be desirable for the blow-mould parts in a closed configuration to be in contact with each other, and it may be desirable for the blow-mould parts in an opened configuration to be arranged separately from each other at least temporarily. The carrier elements have in each case a receiving area or holding area for receiving or holding one blow-mould part in each case. The blow-mould parts in the closed configuration form at least one cavity for the expansion of the containers, which preferably has at least one opening for supplying a fluid acted upon by pressure, in particular compressed air. According to the disclosure the blow-mould parts are capable of being coupled in a magnetic and releasable manner to each other and/or at least one of the blow-mould parts is capable of being coupled in a magnetic and releasable manner to at least one carrier element. This may be advantageous, since the need for mechanical components is reduced by a magnetic coupling. The receiving area of the carrier elements preferably, but not necessarily, surrounds a lateral part of the blow mould at least locally and, in some embodiments, completely.

In some exemplary embodiments of the present disclosure, the blow-mould parts are capable of being fixed magnetically in their position relative to each other and/or at least one of the blow-mould parts is capable of being fixed in position at least with respect to one carrier element. The blow-mould parts can likewise form a unit—coupled to each other and, in some aspects, in contact—likewise independently of the position of the carrier elements, in which case for example they are capable of being conveyed or re-positioned in a simple manner and with little outlay at the same time. Furthermore, these design variants afford the advantage that the individual blow-mould parts, whilst capable of being coupled to the individual carrier elements and preferably contacting them at least in part, form a unit or a unit fixed with each other and this unit is capable of being produced without requiring any mechanical devices.

In addition, engagement elements such as pins or the like can be provided, which in an assembled state of the blow-mould part on the carrier element prevent the blow-mould part from being displaced with respect to the carrier element in the longitudinal direction of the blow-mould part.

In some exemplary embodiments of the present disclosure, at least one of the blow-mould parts, and preferably both the blow-mould parts, and/or at least one of the carrier elements, and preferably both the carrier elements, has or have magnet components of which the field strength is variable at least in part. In this context a variable field strength is likewise to be understood as being the change between an existent and a non-existent magnetic field. This design variant may be advantageous, since this coupling is capable of being released and formed in a simple and rapid manner on account of the magnetic coupling of the individual components.

In some exemplary embodiments of the present disclosure, the blow-mould parts extend in a longitudinal direction and at least one of the blow-mould parts is rotatable, in a state coupled to the carrier element, with respect to the carrier element in at least one first direction of rotation about a real or virtual axis situated in the longitudinal direction. The real or virtual axis may, in some aspects, be formed by a centre axis of the blow mould. This embodiment may be advantageous since the blow mould can be released from the apparatus with little effort, without an existing magnetic field having to be varied in field strength. It would likewise be possible for the magnet components arranged on the carrier elements to be arranged in a manner capable of being deflected and thus to be movable out of the effective range in which they co-operate with at least one blow-mould part. It may be desirable for a movement of this type to take place transversely to the main field lines.

In some exemplary embodiments of the present disclosure, the blow-mould part co-operates in a positively locking manner with a stop in some aspects formed on the carrier element or between the blow-mould part and the carrier element in a second direction of rotation which is orientated contrary to the first direction of rotation. The at least one blow-mould part and the at least one carrier element, which have magnetic components co-operating with field locking at least temporarily, are arranged offset from each other at least temporarily in part in a state of contact and they cause at least temporarily the blow-mould part to be acted upon with a moment about the longitudinal axis for positioning in a defined manner. This embodiment may be advantageous since it is made possible to position the blow-mould parts in a defined manner as a result. The magnetic forces which act between the magnetic components cause the blow-mould part to be pressed against the stop, as a result of which for example movements of the apparatus as a whole do not lead to an erroneous positioning or slippage of the blow-mould part or blow-mould parts since the pressing force must first be overcome.

In some exemplary embodiments of the present disclosure, the blow-mould part and the carrier element in a state of contact are always connected to each other at least in a positively locking manner in order to prevent a rotational movement of the blow-mould part with respect to the carrier element. This is possible for example since the at least one carrier element and the corresponding blow-mould part are formed in a mould or counter-mould which prevents rotation and/or displacement. This may be advantageous since a defined arrangement of one or all of the blow-mould parts is made possible in this way.

In some exemplary embodiments of the present disclosure, the blow-mould part and the carrier element are connected to each other by way of at least one connecting segment to produce a connection with positive locking, preferably between the blow-mould part and the carrier element. This may be advantageous since the carrier element and the blow-mould part are capable of being dimensioned in a simpler and thus more inexpensive manner as compared with other devices for positioning purposes.

In some exemplary embodiments of the present disclosure, at least one base blow-mould part, which is capable of being brought into contact with the blow-mould parts in a base region of said blow-mould parts, is movable with respect to the carrier elements and/or the blow-mould parts and is capable of being coupled, and in some aspects capable of being coupled magnetically, to the blow-mould parts in order to form an at least partially closed space. This embodiment may be advantageous since on account of the magnetic coupling the base blow-mould part is capable of being arranged in a defined manner on the blow-mould parts and this coupling is capable of being formed and released without mechanical components and within a very short time. It is additionally possible for the base blow-mould part to be movable in the direction of the blow-mould parts by means of a piston arrangement, that is, for example, in the vertical direction.

In some exemplary embodiments of the present disclosure, the magnetic components are selected from a group at least comprising electromagnets for actuating at will at least one magnetic field, permanent magnets for producing at least one magnetic field in an energy-independent manner and/or materials capable of being acted upon magnetically for co-operating with the least one magnetic field. "Materials capable of being acted upon magnetically" are to be understood as being any materials which can co-operate with a magnetically active field in such a way that forces are capable of being transmitted. One example of this is iron. This embodiment may be advantageous since any desired combinations of the materials capable of being acted upon magnetically and/or variants of magnets can be provided in any number, as a result of which emergency properties are improved, savings in energy can be achieved and processing procedures are accelerated.

In some exemplary embodiments of the present disclosure, the magnetic coupling (or the magnetic field) between the blow-mould parts and/or a blow-mould part and a carrier element is capable of being short-circuited or formed by the turning of at least one permanent magnet provided on at least one blow-mould part or one carrier element. In this way a magnetic coupling can be formed or released.

The permanent magnet may, in some aspects, be connected to the carrier element and/or the blow-mould part in a fixed manner and is therefore moved in a relative manner by a turning of the carrier element and/or the blow-mould part with respect to the carrier element or the blow-mould part on which it is not situated. This embodiment may be advantageous since the permanent magnet is movable by the turning in an area in which it can be connected with field locking to a further magnet or magnetizable material and without magnetic fields having to be formed or released beforehand by acting upon individual components electrically. It is also in some aspects possible, however, for the permanent magnet to be rotatable or generally movable with respect to the part on which it is positioned. In addition, it would be possible for the permanent magnet to be moved towards the element for holding in each case or away from it respectively, so that a magnetic force can be increased or reduced.

In some exemplary embodiments of the present disclosure, a plurality of magnets have provided relative thereto a movable, and in particular displaceable, field conducting element, which in at least one position short-circuits at least two magnets, i.e. the field lines of at least two magnets, in particular a north pole and a south pole, are short-circuited. The displaceable field conducting element can be designed in the form of a screen which in some aspects may have at least one segment which comprises a material capable of being acted upon magnetically and is capable of being transferred out of a field area of a first magnet into the field area of a second magnet. In this case it is possible for the segment of the field conducting element to touch the respective magnets. It is likewise possible for the field conducting element or the segment to be guided only in one area of the field lines and not to touch the magnets. The field conducting element is formed at least in part from non-magnetizable materials, such as for example plastics materials, glass, ceramics, glass fibres, carbon, which form intermediate segments which are arranged between the segments capable of being acted upon magnetically. In various aspects, the field conducting element may be formed on the same body on which the magnets are also formed with which it is to co-operate.

In some exemplary embodiments the field conducting element may have a plurality of elements or segments which are capable of being acted upon magnetically and which are separated from one another by areas not acted upon magnetically. This embodiment may be advantageous since the magnetic field is capable of being produced or terminated by a simple relative movement of the field conducting element with respect to the magnets. In this case "capable of being terminated" is to be understood as meaning that the magnetic field is situated substantially between the magnetic fields and the field conducting element or is orientated between them.

In some exemplary embodiments of the present disclosure, the magnetic coupling between the blow-mould parts and/or a blow-mould part and a carrier element is capable of being discontinued or formed by the demagnetization or magnetization of at least one permanent magnet. This may be advantageous since in the event of an energy supply being interrupted the coupling between the permanent magnet and the element coupled thereto is always active.

In some exemplary embodiments of the present disclosure, the magnetic coupling between the blow-mould parts and/or a blow-mould part and a carrier element is capable of being altered, and in some aspects formed or discontinued, by the actuation of at least one electromagnet, for example, at least one electromagnet provided on the blow-mould part and/or at least one electromagnet provided on the carrier element. This embodiment may be advantageous since the field strength and thus the power between the individual components (the blow-mould part, the carrier element) is capable of being set as desired. Furthermore, it may be advantageous that the coupling is capable of being altered promptly and/or in accordance with the operation in a manner dependent upon a machining process. In addition, a coupling produced in this way can be varied or amplified, weakened or discontinued in a simple and rapid manner.

In some exemplary embodiments of the present disclosure, at least one sensor device for monitoring the fields produced by the magnetic components and the field strengths thereof is provided. This may be advantageous since fields or field strengths detected by a sensor device of this type are always comparable with standard values or measurement values and thus the individual fields or field strengths are capable of being set and/or checked as desired.

Some further advantages and embodiments may become evident from the attached drawings in which blow-moulding apparatus for producing plastics-material containers are illustrated by way of example. In this case the components of the blow-moulding apparatus, which in the figures correspond at least substantially in terms of their function, can be designated with the same reference numbers, it being unnecessary for these components to be numbered or explained in all the figures.

BRIEF DESCRIPTION OF THE DRAWINGS

In the drawings:

FIG. 6 is a further outline illustration of a further magnetic switch.

DETAILED DESCRIPTION

Figure 1:
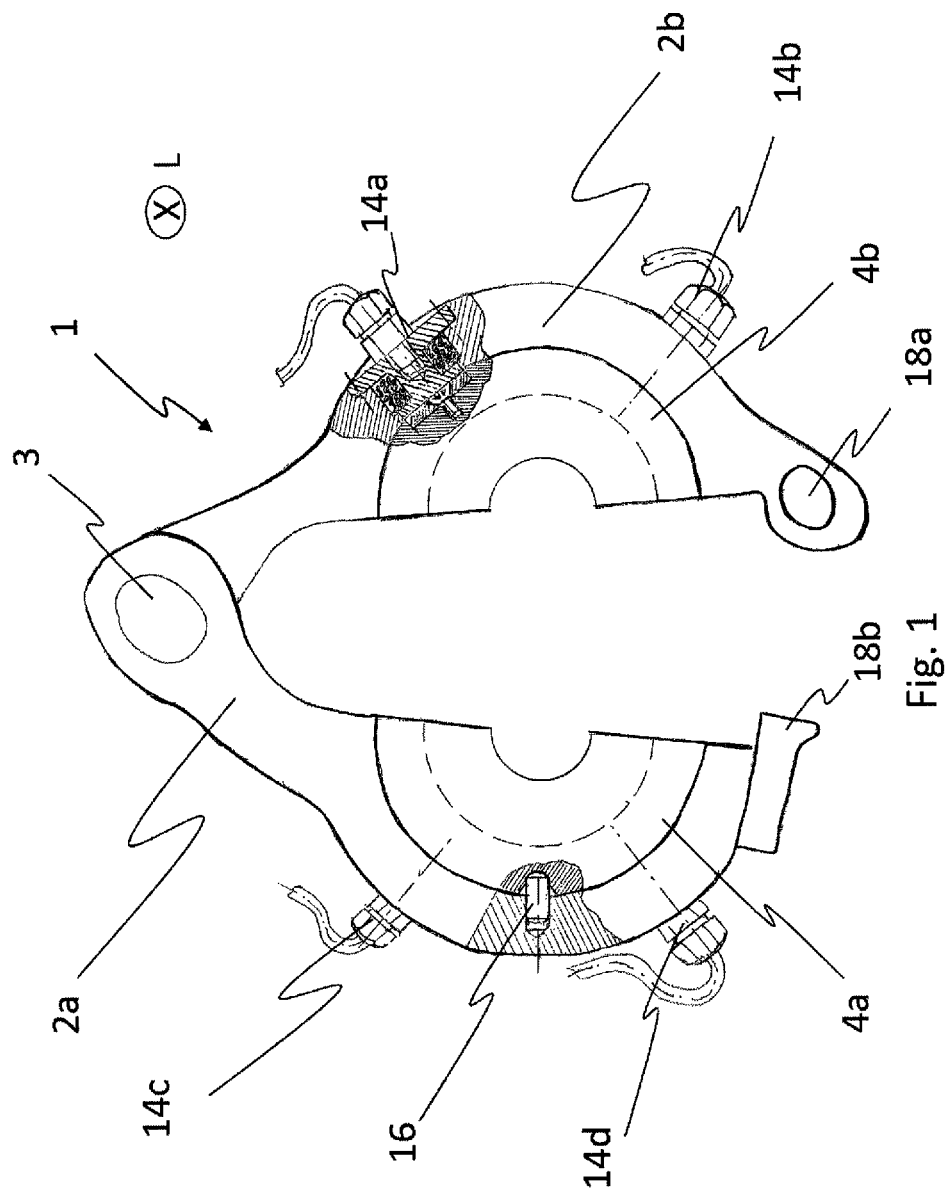
FIG. 1 is a plan view of a blow-mould arrangement.

FIG. 1 is a two-dimensional illustration of a blow-mould arrangement 1 which has a housing at least comprising the housing parts 2a and 2b. The housing parts 2a and 2b are movable towards each other in a rotating manner on a joint 3 and form carrier elements 2a, 2b. In this case it is possible for one of the housing parts 2a, 2b to be arranged in a spatially fixed manner and for only the second housing part 2b to be moved in a rotating manner with respect to the first housing part 2a. The housing parts 2a and 2b are used for receiving blow-mould parts 4a, 4b. The blow-mould parts 4a, 4b are capable of being fixed in the respective housing parts 2a, 2b by means of magnetic coils 14a, 14b, 14c, 14d. By actuation, i.e. activation of the magnetic coils 14a, 14b, 14c, 14d the blow-mould parts 4a, 4b which are, in some aspects, capable of being magnetized at least in part are pulled together in such a way that a pressing force is produced between the housing parts 2a, 2b and the blow-mould parts 4a, 4b. On account of this pressing force the intermediate area between the carrier elements 2a, 2b and the blow-mould parts 4a, 4b is very small or only a contact area. The terms "carrier elements" and "housing parts" are used together in the context of this description.

In the design variant illustrated in FIG. 1 the blow-mould parts 4a, 4b and the receiving areas of the housing parts 2a, 2b are made substantially semicircular, as a result of which rotation of the blow-mould parts 4a, 4b with respect to the housing parts 2a, 2b is possible. In order to prevent such a rotation, cylindrical pins 16 for example are arranged in the housing parts 2a, 2b and/or on the blow-mould parts 4a, 4b, as a result of which a connection with positive locking is capable of being produced between the blow-mould parts 4a, 4b and the housing parts 2a, 2b.

The magnetic coils 14a, 14b, 14c, 14d are, in some aspects, activated in an opened state of the blow-mould arrangement 1 or in the working operation thereof, i.e. they prevent the blow-mould parts 4a, 4b first from being removed or from falling out of the housing parts 2a, 2b. In a closed state of the blow-mould arrangement 1 in which the closure elements 18a and 18b co-operate and the blow-mould parts 4a, 4b preferably touch, it is possible for the magnetic coils 14a, 14b, 14c, 14d to be switched off. It is preferable, however, for the magnetic coils 14a, 14b, 14c, 14d to be activated for as long as the blow-mould parts 4a, 4b are to be held in the blow-mould arrangement 1.

It is likewise possible, contrary to the illustration shown in FIG. 1, for the blow-mould parts 4a, 4b to be held or fastened in each case only with one magnetic coil 14a or a plurality of magnetic coils 14a, 14b, 14c, 14d. Furthermore it is possible for the blow-mould part 4a, 4b to represent not only a magnetizable counter member to the magnetic coils 14a, 14b, 14c, 14d, but likewise to be designed in the form of a magnet and thus to form a pair of magnets with the magnetic coils 14a, 14b, 14c, 14d.

A further exemplary design variant for fixing the individual blow-mould parts 4a, 4b in the housing parts 2a, 2b is conceivable by means of electrical permanent magnets for example. In this case the magnetic force is produced by permanent magnets, which are magnetized and/or demagnetized by current pulses. This embodiment affords a high degree of operational reliability in the event of current failure since the demagnetization is discontinued and the blow-mould parts are connected to the carrier elements. The current pulses for magnetization and demagnetization can be transmitted by way of a contact point to the apparatus or magnet arrangement which is arranged in a stationary manner and contacts all the devices moved past it, in particular the housing parts 2a, 2b and/or the blow-mould parts 4a, 4b. In general the adhesion force or pressing force of the electro-magnets can be checked for monitoring purposes or in order to increase the operational reliability by measuring the current.

The reference numbers 18a, 18b designate a closure or a locking mechanism which locks the carrier elements, in particular during the blow-moulding procedure. The reference letter L designates the longitudinal direction of the blow mould which in this case extends at a right angle to the plane of the figure.

Figure 2:
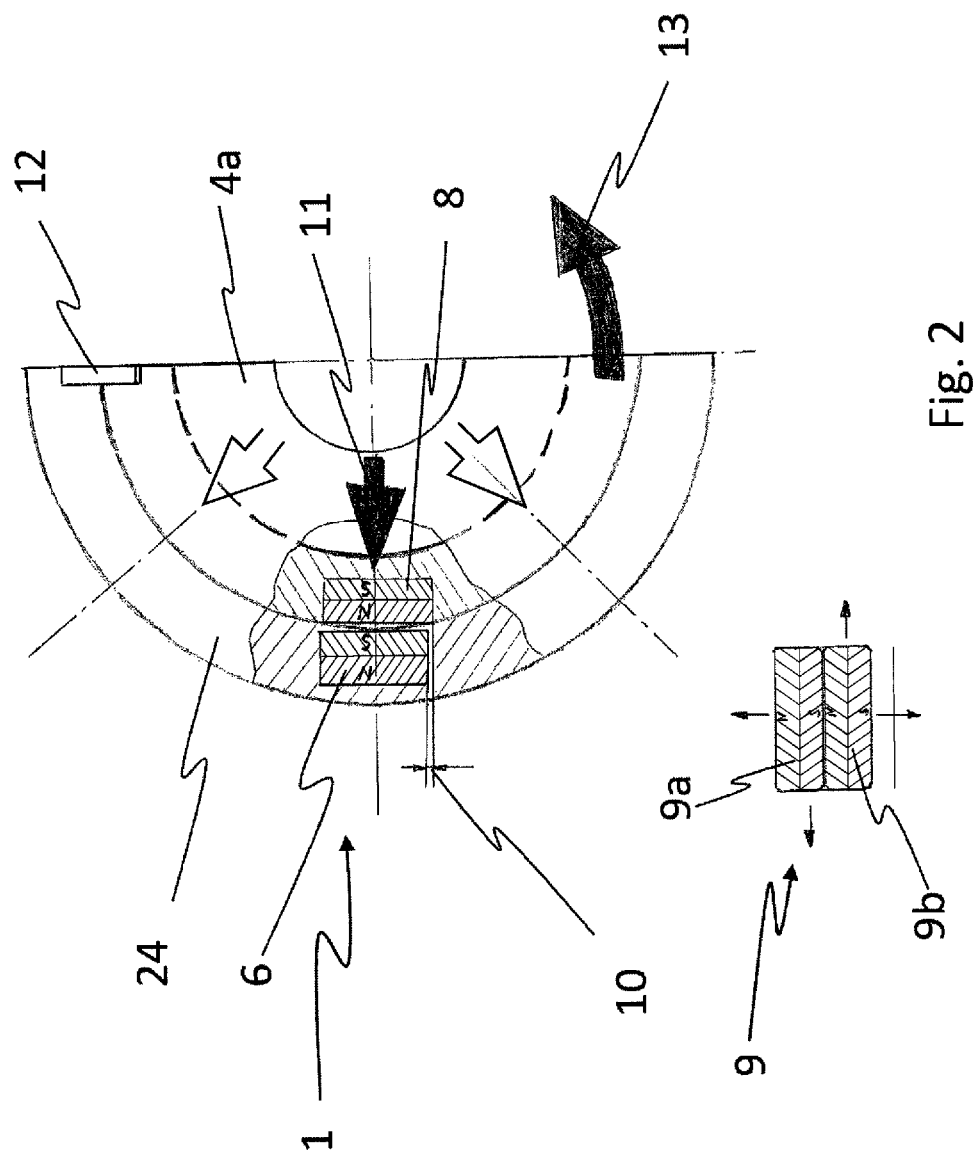
FIG. 2 is a cut-away section of a blow-mould arrangement.

FIG. 2 shows a cut-away section of a blow-mould arrangement 1. This blow-mould arrangement 1 has a housing part 2a and a blow-mould part 4a in contact therewith. The housing part 2a and/or the blow-mould part 4a are made magnetic or capable of being magnetized respectively. In the illustration shown in FIG. 2 the housing part 2a has a first magnet 6 and the blow-mould part 4a has a second magnet 8. The two magnets 6, 8 are, in some aspects, capable of being controlled or actuated in such a way, i.e. the co-operation thereof with field locking is capable of being produced or discontinued in such a way, that in an activated state a non-positive locking or a field locking is capable of being formed between the housing part 2a and the blow-mould part 4a and in a non-activated state, that is for example, during the dismantling of the blow mould, the blow-mould part 4a is released from the housing part 2a.

In the illustration shown in FIG. 2 a distance between the outer edges of the magnet segments 6, 8 of the housing part 2a and the blow-mould part 4a from one another is designated by the reference number 10. During the co-operation of the first magnet 6 and the second magnet 8 and thus the application of a pressing force in the pressing direction 11, the distance 10 permits a rotation of the blow-mould part 4a in a direction opposed to the direction 13. Such a rotation of the blow-mould part 4a results in the blow-mould part 4a being pressed against a stop 12 which is preferably connected to the housing part 2a in a fixed manner. As a result, an extremely simple and precise positioning of the blow-mould part 4a in the housing part 2a is possible. It is likewise possible for orientation of the blow-mould parts or a blow-mould part 4b in the closed state of the blow-mould arrangement 1 to be carried out by deliberate demagnetization of the blow-mould part 4b.

A magnet arrangement comprising an upper and a lower magnet 9a, 9b, which essentially correspond to the magnets 6, 8, is designated with the reference number 9. It is evident from the illustration that, if the magnets are arranged one above the other, a displacement of the magnets 9a, 9b with respect to each other makes it necessary to overcome counter-forces of different magnitudes (indicated by arrows).

Figure 3B:
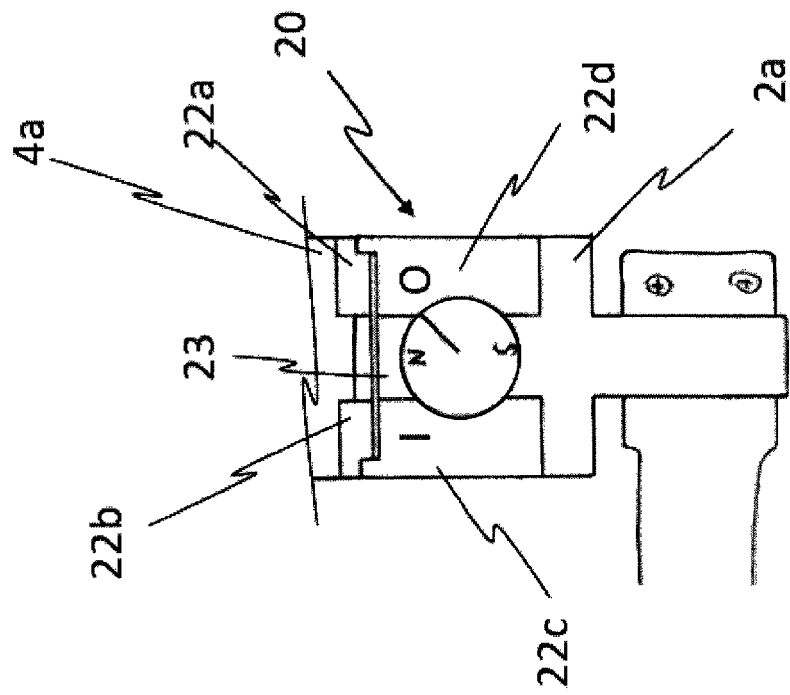
FIG. 3b shows an example of a magnetic switch for fastening a blow-mould part to a housing of a blow-mould arrangement in a second state.
Figure 3A:
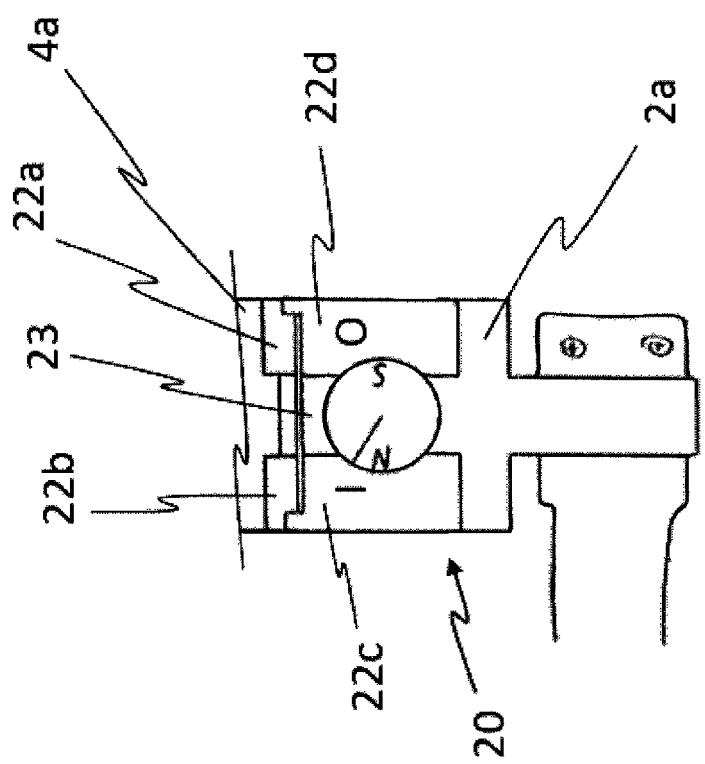
FIG. 3a shows an example of a magnetic switch for fastening a blow-mould part to a housing of a blow-mould arrangement in a first state.

A magnetic switch capable of being actuated manually for producing a field locking between a housing part 2a and a blow-mould part 4a (shown only cut away) is illustrated in FIG. 3a. In the illustration shown in FIG. 3a a magnet locking or field locking is produced between the housing part 2a and the blow-mould part 4a. In this case the magnet locking between the housing part 2a and the blow-mould part 4a is produced by the magnet stressing or field stressing—occurring separately from each other—of the iron element 22c with the north pole N of the magnet and the magnet stressing or the field stressing of the iron element 22d by the south pole S. In this case a coupling is produced between the areas 22c and 22b as well as 22d and 22a respectively, the element designated with the reference number 22 is an aluminium element and is used for decoupling the areas 22b, 22c and 22a, 22d from one another.

A decoupled state is shown in FIG. 3b in which a magnet lock is not present between the housing part 2a and the blow-mould part 4a. The elements 22c and 22d short-circuit in each case the north pole N with the south pole S of the magnet, as a result of which an extension of a magnetic field to the elements 22a and 22b does not take place.

Figure 4:
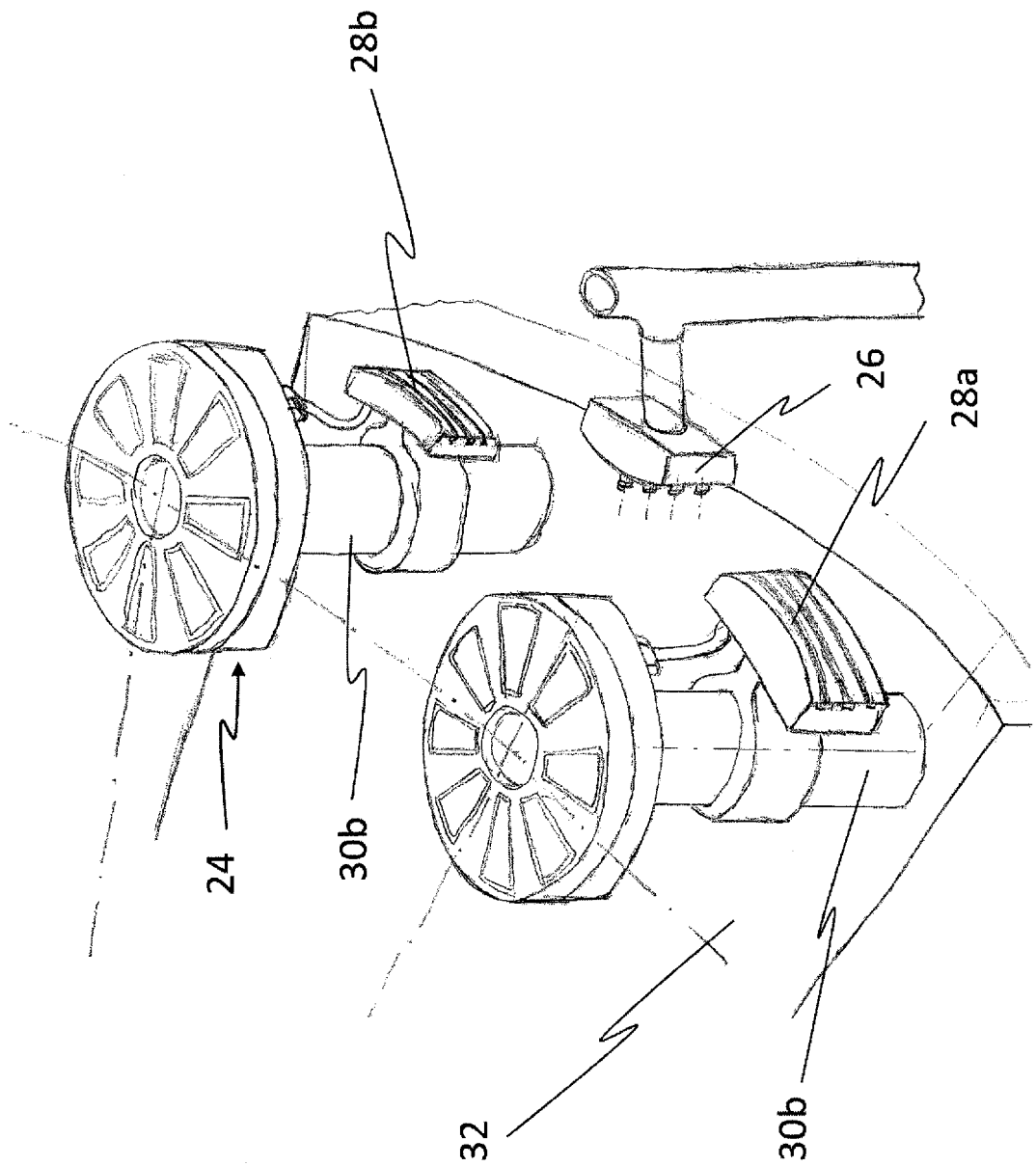
FIG. 4 is a three-dimensional illustration of an arrangement of the base moulds or base carriers of a blow-mould arrangement.

A three-dimensional illustration of two base moulds 24 of the blow-mould arrangement 1 is shown in FIG. 4. The base mould 24, in some aspects, has current collectors 28a, 28b which can co-operate with a stationary current supply 26. The co-operation of the current collectors 28a, 28b with the current supply 26 is carried out by rotation of the base mould 24 on a circular path. It is likewise possible in this case, however, for the base moulds 24 to be arranged in a spatially fixed manner and to be connected to current lines. In addition, it is possible for the base moulds 24 to be acted upon with current by the co-operation with the housing parts 2a, 2b. The base moulds 24 are, in some aspects, arranged opposite a rotating part 32 by means of hydraulic cylinders 30a, 30b and are capable of being deflected vertically, i.e. in the direction of the blow moulds, and are thus capable of being coupled to the blow-mould parts 4a, 4b (not shown) in order to form an interior space in a blow mould.

Figure 5:
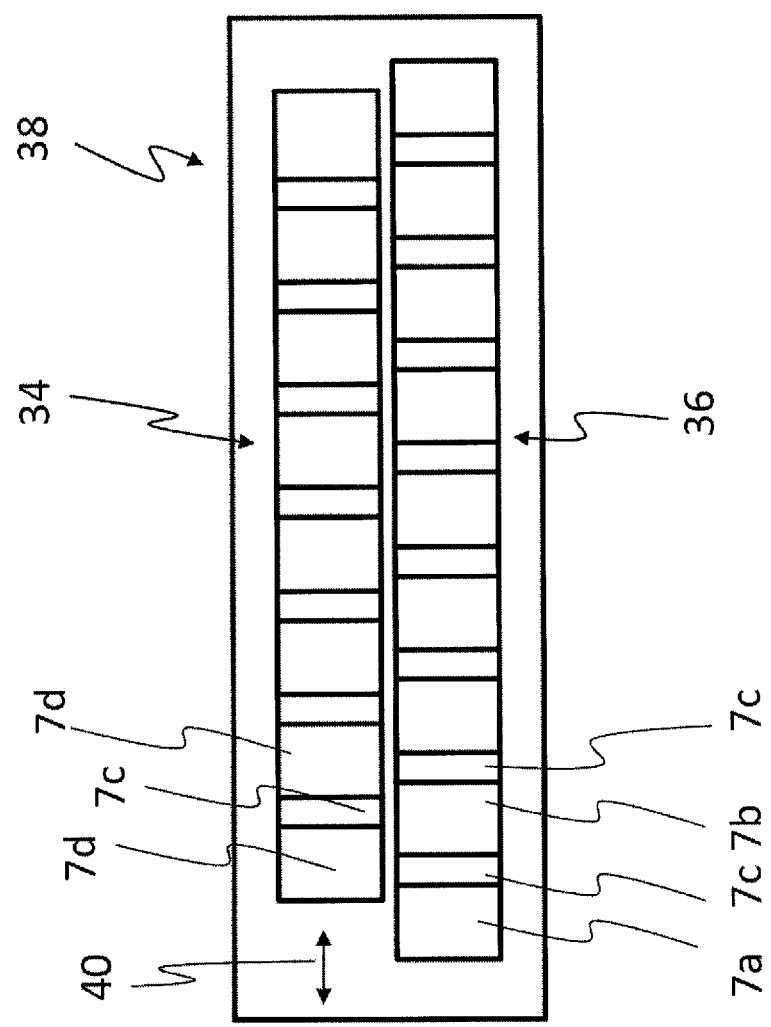
FIG. 5 is an outline illustration of a further magnetic switch.

A further magnet arrangement 38 is shown in FIG. 5, by means of which a magnetic coupling is capable of being set up between a housing part 2a and a blow-mould part 4a (both not shown). It may be desirable for the elements 7a and 7b to be designed in the form of permanent magnets of different polarity and to be spaced from each other by a magnetically insulating element 7c. An arrangement of this type can be provided in an alternating sequence in the form of a fixed arrangement 36, it being possible for a movable element 34 to be provided opposite the fixed arrangement 36. In this case the movable element 34 may comprise magnetizable elements 7d and insulating elements 7c which are arranged between them and which may be reduced in terms of volume and cross-section.

The reference number 40 designates a possible displacement of the movable element 34, as a result of which the magnetizable elements 7d are arranged at least in part above or opposite two differently magnetized permanent magnets. In an at least partially overlapping arrangement (shown in FIG. 5) in which a magnetizable element 7d or magnetizable material overlie at least in part two differently magnetized magnet elements 7a, 7b, the magnetic fields thereof are short-circuited.

The movable element 34 is movable in the direction of the arrow 40 in such a way that the magnetizable elements 7d are capable of being transferred from an overlying state, in which—as already described—they couple magnets 7a, 7b of different polarity to each other, into a decoupled state, i.e. overlie only one magnet 7a or 7b. In this case, for example, the magnets could be arranged in a carrier element and the movable element between these magnets and a blow mould which consists of a magnetizable material. The movable element could be arranged in this case in a rail guideway which may be likewise arranged on the carrier element.

In FIG. 6 the embodiment illustrated in FIG. 5 is illustrated in the form of a round arrangement. It is evident therefrom that either the inner ring and/or the outer ring is rotatable or movable with respect to the other ring in the direction of the reference number 40. As a result of the rotation or movement of the annular segments with respect to one another, a coupling or decoupling of a magnetic field takes place in accordance with the principle described with reference to FIG. 5. The reference numbers 42 and 44 indicate that the individual annular elements can have differing thicknesses or varying thicknesses.

In some exemplary arrangements the magnetic coupling mechanisms described herein can also be applied to the coupling of two blow-mould parts to each other. In this way it may be advantageous if the two lateral parts of the blow mould engage with each other magnetically for the assembly and dismantling of the blow moulds on the blow-mould carriers. In this case the base part of the blow mould could also be arranged on the lateral parts with positive locking and the blow mould could thus be removed from a blow-moulding machine for dismantling in an assembled state.

It will be apparent to those skilled in the art that various modifications and variations can be made to the apparatus for the shaping of plastics-material containers with a blow mould of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. An apparatus for the shaping of plastics-material containers with a blow mould, wherein the blow mould includes at least one first and one second blow-mould part, the apparatus comprising:

at least one first carrier element for holding the first blow-mould part and at least one second carrier element for holding the second blow-mould part, the carrier elements being movable relative to one another at least in one plane in order to be transferred at least from a closed configuration into an opened configuration, the first carrier element having a receiving area for receiving the first blow-mould part and the second carrier element having a receiving area for receiving the second blow-mould part, wherein the first and second blow-mould parts, in the closed configuration, form at least one cavity for the expansion of the containers, wherein at least one of the blow-mould parts is coupleable to the other of said blow mould parts in a magnetic and releasable manner, wherein the first and second blow-mould parts extend in a longitudinal direction and are rotatable with respect to the first and second carrier elements, respectively, in a state coupled to the respective carrier element, in at least one first direction, and wherein at least one of the first and second blow-mould parts cooperates in a positively locking manner with a stop in a second direction of rotation which is orientated contrary to the first direction of rotation.

2. An apparatus according to claim 1, wherein at least one of the blow-mould parts is at least one of
fixable magnetically relative to the other of said blow-mould parts, and
fixable relative to at least one carrier element.

3. An apparatus according to claim 1, wherein at least one of the first and second blow-mould parts has a magnet component of which the field strength is variable.

4. An apparatus according to claim 1, wherein at least one of the first and second blow-mould parts and at least one of the first and second carrier elements have magnetic components which cooperate with field locking and which are arranged offset from each other in a state of contact and cause the blow-mould part to be acted upon with a moment in the second direction of rotation for positioning in a defined manner.

5. An apparatus according to claim 1, wherein at least one of the first and second blow-mould parts and the respective one of the first and second carrier elements in a state of contact are always connected to each other in a positively locking manner in order to prevent a rotational movement of the said one blow-mould part with respect to the respective carrier element.

6. An apparatus according to claim 1, further comprising at least one base blow-mould part movable into contact with the first and second blow-mould parts in a base region of said first and second blow-mould parts, the base blow-mould part being movable with respect to at least one of the first and second carrier elements and the first and second blow-mould parts, the base blow-mould part being magnetically coupleable to the first and second blow-mould parts in order to form an at least partially closed space.

7. An apparatus according to claim 3, wherein the magnetic components are selected from a group at least comprising electromagnets, permanent magnets, and materials capable of being acted upon magnetically for cooperating with the least one magnetic field.

8. An apparatus according to claim 1, wherein at least one of the magnetic coupling between the first and second blow-mould parts and the magnetic coupling between one of the first and second blow-mould parts and a carrier element is configured to be alternatively short-circuited and formed by the turning of at least one permanent magnet provided on at least one of the first and second blow-mould parts and carrier elements.

9. An apparatus according to claim 8, further comprising a field conducting element movable relative to at least two magnets, wherein in one position the field conducting element short-circuits the at least two magnets.

10. An apparatus according to claim 1, further comprising at least one permanent magnet configured to alternatively demagnetize and magnetize at least one of the magnetic coupling between the first and second blow-mould parts and the magnetic coupling between one of the first and second blow-mould parts and the respective carrier element to discontinue or produce the magnetic coupling therebetween.

11. An apparatus according to claim 1, further comprising at least one electromagnet actuable to alter at least one of the magnetic coupling between the first and second blow-mould parts and the magnetic coupling between one of the first and second blow-mould parts and the respective carrier element.

12. An apparatus according to claim 11, wherein the at least one electromagnet is actuable to produce or discontinue at least one of the magnetic coupling between the first and second blow-mould parts and the magnetic coupling between one of the first and second blow-mould parts and the respective carrier element.

13. An apparatus according to claim 12, wherein said at least one electromagnet comprises at least one electromagnet provided on one of the first and second blow-mould parts and at least one electromagnet provided on one of the first and second carrier elements.

14. An apparatus according to claim 1, wherein at least one sensor device is provided for monitoring the field strengths produced by the magnetic components.

15. An apparatus according to claim 1, wherein at least one of the carrier elements has a magnet component of which the field strength is variable.

16. An apparatus according to claim 3, wherein at least one of the carrier elements has a magnet component of which the field strength is variable.

17. An apparatus for the shaping of plastics-material containers with a blow mould, wherein the blow mould includes at least one first and one second blow-mould part, the apparatus comprising:
at least one first carrier element for holding the first blow-mould part and at least one second carrier element for holding the second blow-mould part, the carrier elements being movable relative to one another at least in one plane in order to be transferred at least from a closed configuration into an opened configuration, the first carrier element having a receiving area for receiving the first blow-mould part and the second carrier element having a receiving area for receiving the second blow-mould part,
wherein the first and second blow-mould parts, in the closed configuration, form at least one cavity for the expansion of the containers, wherein at least one of the blow-mould parts is at least one of
coupleable to the other of said blow mould parts in a magnetic and releasable manner, and
coupleable in a magnetic and releasable manner to at least one carrier element, and
wherein at least one of the magnetic coupling between the first and second blow-mould parts and the magnetic coupling between one of the first and second blow-mould parts and a carrier element is configured to be alternatively short-circuited and formed by the turning of at least one permanent magnet provided on at least one of the first and second blow-mould parts and carrier elements.

18. An apparatus for the shaping of plastics-material containers with a blow mould, wherein the blow mould includes at least one first and one second blow-mould part, the apparatus comprising:

at least one first carrier element for holding the first blow-mould part and at least one second carrier element for holding the second blow-mould part, the carrier elements being movable relative to one another at least in one plane in order to be transferred at least from a closed configuration into an opened configuration, the first carrier element having a receiving area for receiving the first blow-mould part and the second carrier element having a receiving area for receiving the second blow-mould part,
   wherein the first and second blow-mould parts, in the closed configuration, form at least one cavity for the expansion of the containers, wherein at least one of the blow-mould parts is at least one of
      coupleable to the other of said blow mould parts in a magnetic and releasable manner, and
      coupleable in a magnetic and releasable manner to at least one carrier element; and
at least one electromagnet actuable to alter at least one of the magnetic coupling between the first and second blow-mould parts and the magnetic coupling between one of the first and second blow-mould parts and the respective carrier element.

* * * * *